May 15, 1928.  1,670,254
E. B. GOWIN
EDUCATIONAL FOLDER
Filed March 31, 1922
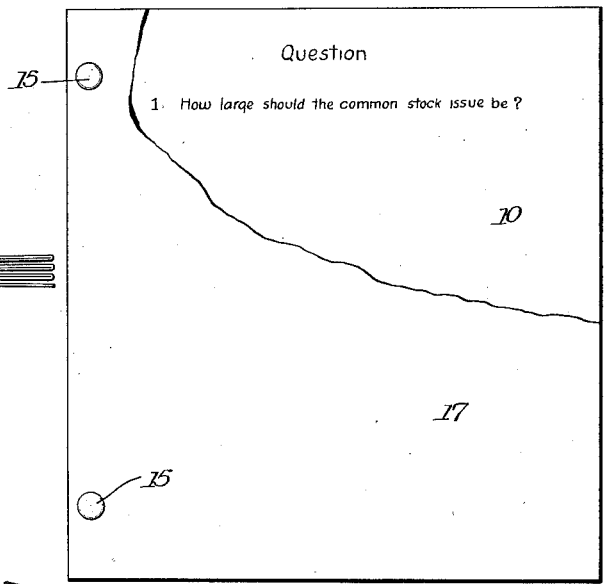
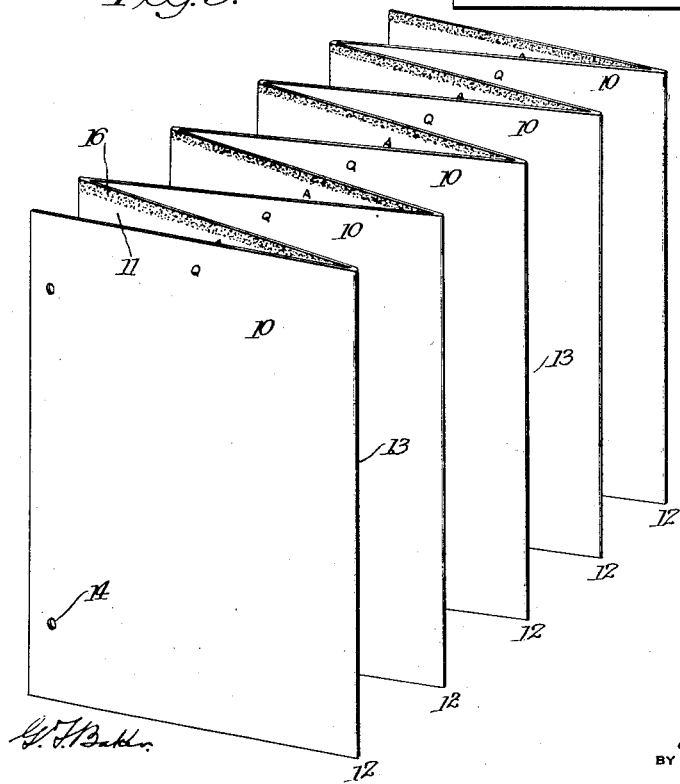
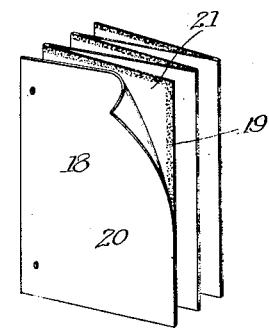
E. B. Gowin, INVENTOR Patented May 15, 1928.

1,670,254

UNITED STATES PATENT OFFICE.

ENOCH BURTON GOWIN, OF WASHINGTON, DISTRICT OF COLUMBIA.

EDUCATIONAL FOLDER.

Application filed March 31, 1922. Serial No. 548,432.

This invention relates to new and improved educational devices and has for an object the provision of a folder arranged to contain a number of separate examinations with the questions and answers so disposed that the former may be exposed, while the latter will be concealed, the construction being such as to render the answers inaccessible unless the folder is mutilated, which will indicate the answers have been read.

With the above and other objects in view, the invention further includes the following novel features and details of construction, to be hereinafter more fully described, illustrated in the accompanying drawings and pointed out in the appended claim.

In the drawings:—

Figure 1 is an elevation of an educational folder constructed in accordance with the invention, the title page being partly broken away.

Figure 2 is a top edge view of the same.

Figure 3 is a perspective view of the folder before the back has been fastened together.

Figure 4 is a similar view showing a modified form of folder.

Referring in detail to the drawings, wherein like characters of reference denote corresponding parts, the form of the invention illustrated in Figures 1 to 3 comprises a folder which is formed from a single strip of paper folded after the manner of an accordion to provide outer pages 10 and inner pages 11, the said pages being arranged in pairs as indicated at 12 with their outer longitudinal edges connected along the fold as shown at 13. The opposite edges of the pages are provided with openings 14 for the passage of suitable fastening devices 15 so that the folder may be arranged in book formation with the pages of double formation.

Each of the pages 10 is adapted to contain a number of examination questions, while the answers to these questions are contained upon the pages 11, the answers upon page 11 of one pair of pages, relating to the questions upon page 10 of that particular pair. Thus a number of separate examinations may be contained within the folder, each double page 12 containing the questions and answers for one examination, or, the examination may extend to a number of double pages, the answers to the questions contained upon each double page, being within the fold of that particular page.

The upper edge of each pair of pages is provided along the inner part of the fold with a strip of adhesive as shown at 16, while the bottom edges within the folds are likewise provided with a strip of adhesive. Each pair of pages may thus be sealed along its top and bottom edges and as the fold 13 acts to close the front edge, the page 11 or answer page will be effectually sealed and will not be accessible without separating the top, bottom and outer edge of the pages. This will serve to mutilate the edges of the folder and will indicate that the answers to the questions upon the pages so mutilated, have been read.

The folder when arranged in book form is preferably provided with a title page 17, which is adapted to contain any suitable indicia, such for example as a statement of the character of the examinations contained within the folder.

In Figure 4 there is illustrated a modified form of the invention in which the pages of the folder are made of separate sheets 18 and are provided along their top, bottom and outer edges with a strip of adhesive 19, by means of which the folder may be arranged to provide question pages 20 and answer pages 21, with the latter sealed.

The invention is susceptible of various changes in its form, proportions and minor details of construction and the right is herein reserved to make such changes as properly fall within the scope of the appended claim.

Having described the invention what is claimed is:—

A folder embodying a sheet having an accordion-like fold and providing a plurality of pairs of inner pages and pairs of outer pages containing printed matter, the inner pages of each pair containing printed matter relating to the matter contained upon the outer pages, binding means at one edge and adhesive means on a portion of the confronting surfaces adjacent the other edges of the inner pages sealing the inner pages whereby they may be exposed only after mutilation.

In testimony whereof I affix my signature.

ENOCH BURTON GOWIN.